UNITED STATES PATENT OFFICE 2,416,235

5-NITRO-2-(ω-HYDROXYACETOFURONE) SEMICARBAZONE

William B. Stillman and Albert B. Scott, Norwich, N. Y., assignors, by mesne assignments, to Eaton Laboratories, Inc., Norwich, N. Y., a corporation of New York No Drawing. Application August 28, 1945, Serial No. 613,206

1 Claim. (Cl. 260—345)

This invention relates to a new chemical compound 5-nitro-2-(ω-hydroxyacetofurone) semicarbazone described by the formula:

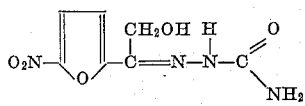

We have made the surprising discovery that this new compound, while sharing the antiseptic properties which are common to many nitrofurans, is distinguished from other nitrofurans having a closely related structure by its effectiveness against infections when administered orally. In doses well below the toxic limit it has proved highly effective in the treatment of streptococcus and trypanosome infections and is a valuable chemotherapeutic agent.

The preparation of the new drug in a form which will permit ready oral administration is easy. It may be incorporated in tablets or in lozenges. Such tablets are compounded in conventional fashion by granulating the drug with standard starch paste, drying, adding dry starch and pressing out the tablets. The lozenges are compounded in conventional fashion also by granulating with sugar syrup and then adding bulk in the form of powdered sugar and dry starch, and a flavoring material.

The new compound may be synthesized by means of the well-known reaction between aldehydes or ketones and semicarbazides to form the corresponding semicarbazones.

In order that the invention may be entirely available to those skilled in the art, a method for making it is described briefly:

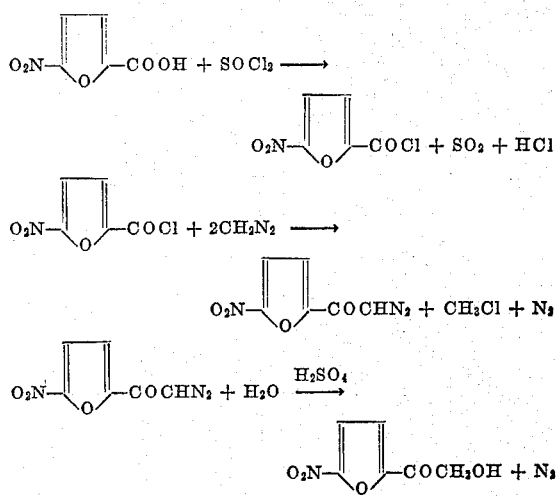

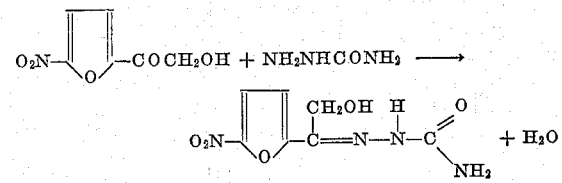

5-nitrofuroyl chloride is prepared by the action of boiling thionyl chloride on 5-nitrofuroic acid. Then, to a solution of 5.8 g. (0.138 mole) of diazomethane (prepared from nitrosomethylurea as described in Org. Syn. 15, 3) in 150 cc. of ether, cooled to 0°, is added slowly, a solution of 12.1 g. (0.069 mole) of 5-nitrofuroyl chloride in 100 cc. of ether. Vigorous evolution of nitrogen gas occurs. When this subsides, the mixture is allowed to stand overnight at room temperature, at which time a yellow precipitate of 5-nitrofuryl diazomethyl ketone settles out.

The diazo ketone is purified by recrystallization from 50% alcohol as tiny, light yellow needles; M. P. 113–114.5°. Then, 9.6 g. (0.053 mole) of this compound is warmed on a steam bath with 100 cc. of 4% sulfuric acid. The mixture soon becomes dark in color, and the diazo ketone dissolves, with evolution of nitrogen. Warming is continued until the nitrogen evolution is complete; the total time of reaction is about fifteen minutes. The dark-red mixture is cooled in ice, whereupon crystals of 5-nitro-2-ω-hydroxyacetofurone separate. This compound is purified by recrystallization from ethyl acetate:ligroin (1:1) as light-yellow plates; yield 5.0 g. (56%); M. P. 116–117.50.

5 - nitro - 2 - (ω - hydroxyacetofurone) semicarbazone is prepared by addition of 3.3 g. (0.03 mole) of semi-carbazide hydrochloride to a solution of 5.0 g. (0.03 mole) of 5-nitro-2-ω-hydroxyacetofurone in 400 cc. of water. The product is obtained in the form of beautiful, long, yellow needles; yield 6.2 g. (91%); M. P. 197–200° (w. decomp.); solubility in water, 1:2500.

What is claimed is:

5-nitro-2-(ω-hydroxyacetofurone) semicarbazone represented by the formula:

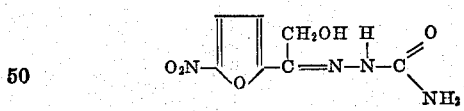

WILLIAM B. STILLMAN.
ALBERT B. SCOTT.